Sept. 29, 1964   B. H. BALDRIDGE   3,151,323
SYSTEM FOR REMOTE RADAR OPERATION
Filed Feb. 27, 1959   2 Sheets-Sheet 2

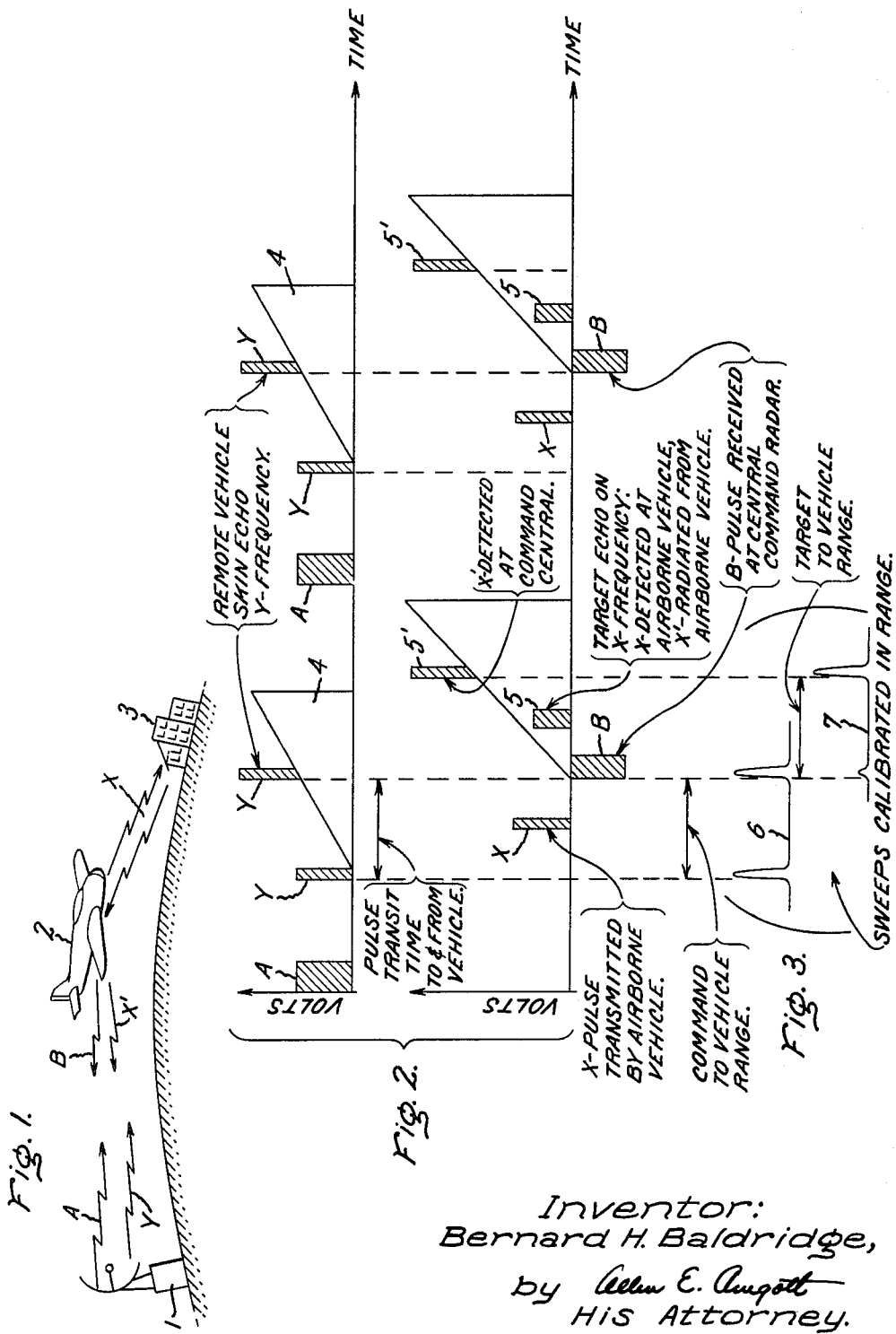

Inventor:
Bernard H. Baldridge,
by Allen E. Amgott
His Attorney.

3,151,323
SYSTEM FOR REMOTE RADAR OPERATION

Bernard H. Baldridge, New Hartford, N.Y., assignor to General Electric Company, a corporation of New York
Filed Feb. 27, 1959, Ser. No. 796,040
8 Claims. (Cl. 343—6)

This invention relates generally to radar systems, and more particularly to the type of radar systems used in connection with airborne vehicles such as drones or satellites.

In many modern-day radar systems which utilize data relayed to a central command radar from an airborne vehicle, it is necessary to provide for an exchange of synchronizing signals in order to ensure that proper time relationships may be displayed on the radar oscilloscope located at the remote central command radar. The information necessary for timing the sweep circuits and the associated stages of circuitry to provide a visually observable radar pattern at the remotely situated command radar station is ordinarily acquired from such synchronizing data.

In this type of prior art system, the target data which is relayed from the airborne reconnaissance vehicle often suffers a degradation in message content because of the detection and telemetry processes to which data in its original form must be subjected.

According to one aspect of the present invention, an airborne radar is synchronized by signals from a central command radar and is timed by means of electromagnetic (radar) energy. As a result, it is possible to relay the radar data very simply over a relatively narrow band communication link. The target data thus obtained by the airborne vehicle is capable of pictorial display at the central command radar without the undesirable loss of coherence and diminution in information content which inevitably accompanies retransmission by telemetry. In practicing this aspect of the invention, moreover, all of the electrical data required for the sweep circuit timing functions is provided without any exchange of synchronizing signals.

In this embodiment of the inventive system, means are provided for establishing bearing data with respect to an airborne radar by exploiting command telemetry circuitry and components in conjunction with a radar transponder beacon. As a result, the timing function which is normally performed by a radar enhancement beacon also accomplishes vehicle command and telemetry functions in conjunction with the central command radar.

By providing both control and telemetry commands to the airborne radar for use in conjunction with a radar transponder beacon unit, certain highly advantageous effects are obtained. For example, by utilizing the radar skin echoes with data simultaneously received from the airborne vehicle, entirely automatic correlation between received radar tracking data and the reply data associated with a two-way command telemetry communication system is provided. In order to accomplish these objectives, a radar set such as a side-looking radar in a drone aircraft is arranged to periodically transmit its main pulse on a first frequency. The transmission of this main pulse occurs only upon receipt of the main pulse transmitted by a central command radar on a different frequency. When the radar energy of the first frequency returns from the target to the airborne vehicle, it is heterodyned to a completely new frequency and retransmitted back to the central command radar.

At the central command radar, the sweep voltage for displaying the range between the target and the airborne vehicle is allowed to rise only upon detection at the central command radar of radiant energy of the (1) airborne vehicle skin echo, (2) transponder beacon return, or (3) radar frequency main pulse transmitted from the airborne vehicle, where the vehicle is properly orientated. All three signals will arrive at the central command location simultaneously. In other words, electromagnetic energy in the form of skin echo and beacon response which emanates from the airborne vehicle coincident with the vehicle main pulse for the purpose of scanning the target, must propagate to the central command radar for the purpose of triggering the sweep voltage used to display target-to-vehicle range therein.

When the skin echo and beacon response of the first wave which was propagated from the central command radar is received at the central radar, receipt of this energy will coincide exactly in time with the receipt of the main pulse from the airborne vehicle if it is received. This is an important aspect of the present invention. The significance of this phenomena resides in the discovery that all radar target echoes received in an airborne vehicle and retransmitted on a completely new frequency are in the usual radar time or range relationship with the skin echo of the originally transmitted pulse detected at the central command radar. This means that the luminous trace of target-to-vehicle range on a radar oscilloscope can accurately be initiated as soon as the skin echo of the tracking pulse or beacon response is detected at the central command radar. It also means that the deflection of this trace to provide a radar pip at the central command radar immediately upon detection of the heterodyned frequency from the vehicle is an event which appears to coincide timewise with receipt of a target echo at the airborne vehicle, on a wave form of the respective events. This coincidence will be explained and referred to in greater detail later in the present patent specification.

The sweeps at the central command radar are thus timed from the skin echo of the originally transmitted signal and the requirement of sychronization exchange is eliminated. The bearing is determined by vehicle orientation, in a manner which will be fully explained hereinafter.

By exploiting the relationship between the heterodyned target echoes radiated from the airborne vehicle and the skin echoes of the initial transmission, improved data is obtained with a bare minimum of equipment needed in the airborne vehicle. Moreover, radar control data, telemetry data and target scanning radar data are automatically correlated in time in a manner which tremendously facilitates data processing techniques. Moreover, by this means, a radar beacon function, and a vehicle command and telemetry data link function are thus provided in combination with a system synchronization function.

Accordingly, therefore, an important object of the present invention is to provide method and means for permitting radar scanning of a remote target by means of an airborne vehicle such as a drone or satellite with a visual radar display provided in a remote station.

Another object of the present invention is to provide method and means for heterodyning and retransmitting target echoes received by an airborne vehicle to a central command radar for use in deflecting or intensifying sweep voltages which are utilized in providing a visual radar display located therein.

Another object of the present invention is to exploit the radar time and range relationship which exists between the skin echo received on a first frequency and a heterodyned target echo relayed from an airborne vehicle on another frequency, to eliminate the need for exchanging synchronizing data.

A further object of this invention is to provide method and means for establishing radar bearing data with respect to an airborne radar by utilizing a radar transponder beacon in conjunction with telemetry circuitry within an airborne vehicle.

A still further object of the present invention is to provide a system in which detection, display, processing and timing functions for an airborne radar are provided by circuitry remotely located in a central command radar station.

A still further object of this invention is to exploit the relationship between radar skin echoes and a heterodyned signal transmitted from an airborne vehicle in conjunction with command and telemetry data.

These and other objects and advantages of the present invention will become apparent by referring to the accompanying detailed description and drawings in which:

FIGURE 1 illustrates diagrammatically the manner in which the present invention utilizes a plurality of separate and discrete frequencies.

FIGURE 2 shows the time relationship between the wave forms of the sweep voltages and other events which occur during the practice of the invention.

FIGURE 3 illustrates a visual radar display in which the time coincidence between detection of a target echo at the airborne vehicle and receipt of the heterodyned frequency at the central command radar is illustrated.

Figure 4:
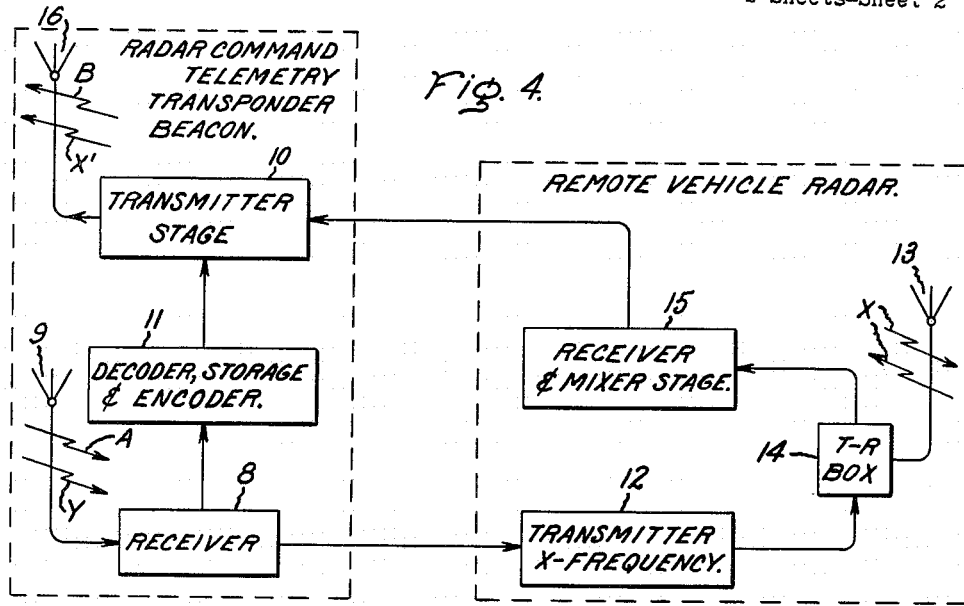
FIGURE 4 shows in block diagram form the circuitry and components of the radar system contained in an airborne vehicle according to the present invention.

Turning now to the detailed description of the invention and more particularly to FIGURE 1, the numeral 1 has been used to designate a central command radar which is equipped with apparatus for radiating and receiving radar signals. In this figure, there is illustrated an airborne vehicle 2 which may comprise the type of unmanned drone employed in battlefield reconnaissance, an unmanned early warning vehicle, or the like. The vehicle 2 may similarly comprise a reconnaissance and exploration satellite capable of controlled placement in an orbit which encircles the earth.

The central command radar in FIGURE 1 is capable of radiating an initial pulse of electromagnetic energy on frequency Y. The vehicle 2 is equipped with circuitry and components which permit the generation and propagation of radiant energy on a frequency X. The radar equipment provided for this purpose in the airborne vehicle may comprise a side-looking radar of the type employed in drone aircraft. The main pulse of energy on frequency X is transmitted by the equipment in vehicle 2 only upon receipt of the main pulse of electromagnetic energy on frequency Y from the command radar 1.

The radiant energy which is propagated from vehicle 2 on frequency X, according to well-known radar theory, will be reflected and repropagated back from a target 3 in the direction of the airborne vehicle 2 for detection therein. Coincident with the main pulse on frequency X, however, the skin echo of frequency Y occasioned by impingement upon vehicle 2 has begun to diffuse and propagate back toward the central command radar. Timewise, the skin echo on frequency Y which is propagated back to the command radar 1 coincides with the arrival of energy of frequency X emitted by the airborne vehicle had it been orientated with the radar beam pointed at command radar 1.

The target echoes on frequency X which are detected within the vehicle 2 are heterodyned or detected to form a frequency X'. Frequency X' is then deliberately propagated for detection within the remote central command radar.

The central command radar is also equipped to radiate a pulse A which interrogates a transponder beacon unit within the vehicle 2. The pulse on frequency A generally comprises data in a command data link, and is cyclically transmitted just prior to the pulse of tracking radar energy on frequency Y, as will become clear in connection with the detailed description of the wave forms in FIGURE 2. The transponder unit in vehicle 2 responds to interrogation on frequency A by returning a pulse on frequency B coincident with the skin echo on frequency Y. The term "radar transponder beacon unit" as used in the present specification will be understood by those skilled in the art to mean an airborne beacon which includes a receiver for receiving interrogation signals on one frequency and a transmitter controlled by the output of such receiver for transmitting signals on a different frequency.

Having discussed the manner in which pulses of energy radiated on frequency Y in FIGURE 1 give rise to the emission of radar pulses of frequency X, which events are followed by retransmission of a frequency X'' from the airborne vehicle, reference to the wave form chronology shown in FIGURE 2 will now be made. In this figure, an understanding of the time spacing of the several pulses is valuable in understanding the underlying principles of the invention.

In the upper wave form in FIGURE 2, the initial pulse of energy at frequency A is shown to commence at the origin of the time axis. The pulse A is an interrogation pulse for the airborne transponder unit used in the invention and carries "prepare to reply heading data," "take heading," "return to base" or other commands. Immediately following the transmission of pulse A, the next occurrence is the radiation of energy at frequency Y by the command radar. The radar transponder unit in the airborne vehicle is connected to reply or accept commands upon receipt of the Y frequency energy at the vehicle. The pulse of radiant energy Y emanating from the central command radar is propagated outwardly into space in the direction of the airborne vehicle 2. It will be understood that the pulse Y comprises a control or tracking radar pulse.

The pulse Y in FIGURE 2 is shown in time correlation with a linearly rising wave form generated as a tracking radar sweep potential by the central command radar. After the propagation of pulse Y and one way transit time has elapsed, energy on this frequency is detected by the airborne vehicle 2. At this time, the main pulse of energy on frequency X will be transmitted by the airborne vehicle. This is shown in the lower wave form diagram of FIGURE 2 as the next incident which occurs after emission of the tracking radar pulse Y.

While the main pulse radiant energy at frequency X is being propagated towards the target 3, the transponder beacon radiant energy on frequency B coincident in time with the Y frequency skin echo will travel to and reach the central command radar for detection therein. In the lower wave form diagram of FIGURE 2, the instant at which the B pulse energy from the airborne vehicle is detected at the central command radar coincides with the skin echo on frequency Y and is identified by an appropriate legend.

Attention is now directed to the time coincidence between the receipt of the transponder beacon on frequency B from the airborne vehicle and the receipt of the skin echo on frequency Y. In the upper diagram, this skin echo from the remote vehicle on frequency Y is indicated on the tracking radar sweep wave potential which is identified by the reference numeral 4. The manner in which detection of this skin echo takes place simultaneously with receipt of the pulse on frequency B from the airborne vehicle is believed clear from an inspection of this drawing.

In the lower wave form in FIGURE 2 it will be observed that the sweep potential which displays the range between the target and the airborne vehicle is allowed to rise only from the instant at which the B pulse (corresponding in time with the X pulse) from the airborne vehicle is received at the command radar. This sweep potential continues to rise uniformly, and to deflect an appropriate electron beam within a radar oscilloscope to provide a luminous trace thereacross. The next significant occurence in the wave forms shown in FIGURE 2 is the detection of the target echo on frequency X within the vehicle 2.

This occurrence is indicated in FIGURE 2 by the reference numeral 5. After the electromagnetic energy forming this target echo has been detected and heterodyned within the airborne vehicle, a new frequency X' is radiated back to the central command radar. After a time corresponding to one way transit time, the detection at the central command radar is the next significant occurrence. This occurrence is indicated by the reference numeral 5' in FIGURE 2. The utilization of the skin echo or beacon response time relationship with respect to the receipt of frequency X' at the central command radar and detection of target echo energy on frequency X at the airborne vehicle comprises an important aspect of the present invention.

As mentioned earlier in the present specification, all of the X echoes received in the remote airborne vehicle and radiated at frequency X' are in the usual radar signal transit time or range relationship to the skin echo received from the vehicle 2 on frequency Y at the central command radar. By timing the sweep from this Y-frequency skin echo, the requirement for synchronization exchange data is completely obviated and bearing data may be determined by the orientation of the vehicle. More particularly, the vehicle heading or target bearing data may be derived directly from the intelligence in the B-pulse energy received at the central command radar after emission coinciding with the main pulse of X-pulse energy by the airborne vehicle. The vehicle range is established by conventional radar ranging on Y frequency. These placements are of course seen most clearly in connection with the wave form diagram shown in FIGURE 2.

The visual exploitation of these radar time or range relationships is best illustrated in FIGURE 3 of the accompanying drawings. In this figure, the reference numeral 6 identifies a luminous range trace provided on the phosphorescent inner face of a radar oscilloscope. The trace 6 indicates visually the range between the central command radar and the airborne vehicle. Beneath the trace 6, a trace 7 indicates the range between the target and the airborne vehicle. It will be noted in trace 7 that the sweep has been allowed to start immediately upon receipt of B-frequency energy at the command radar. Moreover, the sweep has been exposed to a vertical deflecting potential immediately upon receipt of energy of frequency X' at the central command radar. The means for exploiting the time coincidence between receipt of the B-pulse and receipt of the skin echo of frequency Y at the central command radar is clearly illustrated in FIGURE 3, and the initiation of the sweep voltage for trace 7 responsive to the simultaneous occurrence of these events is graphically depicted. Additionally, the upward deflection of the sweep upon receipt of the heterodyned frequency X' at the central command radar may be clearly appreciated from an inspection of this figure. The time relationship between detection of X' energy at command central and the detection of the X-frequency target echo by the airborne vehicle is exploited in this manner to deflect the trace to graphically display the range or linear distance between the airborne vehicle and the target. It will be appreciated by those skilled in the art that the traces 6 and 7 can readily be combined into a single unified range pattern, and that such mode of representation would fall equally well within the purview of the appended claims.

Continuing with the detailed description of the invention, reference to the block diagram and circuitry of the airborne vehicle as illustrated in FIGURE 4 will now be made. In this figure, the numeral 8 has been used to identify a receiver which is connected to receive input central command radiant energy from a conventional unidirectional antenna 9. The portion of FIGURE 4 identified by the legend "radar command telemetry transponder beacon" has the function of enabling the central control radar to command control and telemeter as well as distinguish between aircraft and other objects. The receiver 8 shown in this figure is of conventional construction, and may comprise a commercially available radar-type receiver capable of receiving and amplifying signals which are transmitted from the central command radar 1.

The receiver 8 is connected in the circuit of FIGURE 4 to function as an element in a radar command control and telemetry transponder beacon. This means that the receiver is designed to receive and amplify command signals on frequency A from the central control radar 1. It should be appreciated that the receiver 8 is a broad band receiver capable of amplifying radiant energy on frequency Y as well as the radiant energy transmitted from the central command radar on frequency A.

According to the present invention, the output signals produced by receiver 8 in response to the receipt of the command or interrogating pulses are applied to a transmitter 10, through a conventional decoder, storage and encoder unit 11. The decoder, storage and encoder 11 has the function of passing to transmitter 10 data or action acknowledgements requested or commanded by interrogation on command pulse A preceding the main pulse radar pulses radiated by transmitter circuitry provided within the central command radar 1.

The transponder beacon in FIGURE 4 is triggered by the signals received from the radar station on frequency Y. To this end, the system includes a transmitter stage 10 which when triggered by Y signals from the central command, is fed signals from the decoder, storage and encoder 11 to radiate energy on frequency B coincident in time with the skin echo Y-frequency in accordance with the incoming interrogating pulses which have been amplified and detected by the receiver 8. The reply signals on frequency B which include orientation, environment, vehicle condition and other desirable information are received at the central command radar by means of an appropriate antenna assembly located at that site, and may produce an observable display which indicates data in the command data link.

It should be appreciated that the incoming radiant energy on frequency A is applied within receiver 8 to a conventional mixer stage which incorporates a local oscillator functioning at a predetermined frequency. The transponder interrogation frequency A is mixed with this local oscillator frequency, prior to the production of the signal which is employed for energizing the decoder, storage and encoder 11 to provide information to feed the transmitter 10.

It should be similarly appreciated that the signal received on frequency Y from the tracking radar is mixed or heterodyned with the same local oscillator frequency provided in the mixer stage of receiver 8 in order to (1) assist in providing a signal which is used to initiate transmission of the main pulse on frequency X from the airborne vehicle, and (2) trigger the beacon response on frequency B.

In order to accomplish this, a portion of the output of the receiver 8 is connected to energize an X-frequency transmitter identified by the reference numeral 12. The main pulse of electromagnetic energy on the frequency X is radiated from a simplified radar antenna 13, via a transmit-receive (TR) box 14. The TR box 14 is of conventional construction and detail. This element, as is well known to those skilled in the art, has the function of isolating the transmitter circuity during quiescent intervals when an echo from the target is being awaited. The TR box 14 also isolates the other stages of the circuitry when electromagnetic energy from the X-frequency transmitter is being supplied for radiation to the antenna 13.

After the main pulse on frequency X has been transmitted by the antenna 13, a quiescent interval follows during which reflection of a target echo is awaited by the airborne receiver circuitry. After radar energy on frequency X impinges upon the target 3 and returns to the airborne vehicle, this reflected energy is applied through the TR box 14 to a receiver and mixer stage 15. Within the mixer stage 15, the radiant energy at frequency X is mixed or heterodyned with the local oscillator frequency derived within the mixer stage 15. The target echo on frequency X is heterodyned in this manner within mixer stage 15 to produce a completely new frequency X'.

It should be understood that the designation of a separate mixer stage 15 is diagrammatic and has been provided for expositive rather than limitative purposes. The heterodyne frequency or beat frequency X' which is obtained by mixing the local oscillator frequency in mixer stage 15 with the X-frequency target echo is applied to the transmitter stage 10 and then to antenna 16 for transmission to the remote central command.

In practicing the preferred embodiment of the invention, as mentioned immediately above, the value of frequency X is proportioned such that the beat frequency obtained by heterodyning this frequency with the local oscillator frequency in mixer stage 15 provides a value of frequency X'.

The heterodyned frequency X' may conveniently have a value equal to the sum of frequency B plus 30 megacycles and the frequency A can also, for convenience, equal Y plus 30 megacycles. In other words, the heterodyne frequency X' which is re-radiated back to central command radar 1 has a frequency equal to the sum of the transponder reply frequency B plus 30 megacycles.

By using the components shown in FIGURE 4, detection, display, processing and timing functions of the radar system may all be accomplished by circuitry which is located at the central command radar station. In this way, information and data for establishing radar bearing information with respect to the remote airborne vehicle is provided in conjunction with the radar command telemetry transponder beacon.

Figure 5:
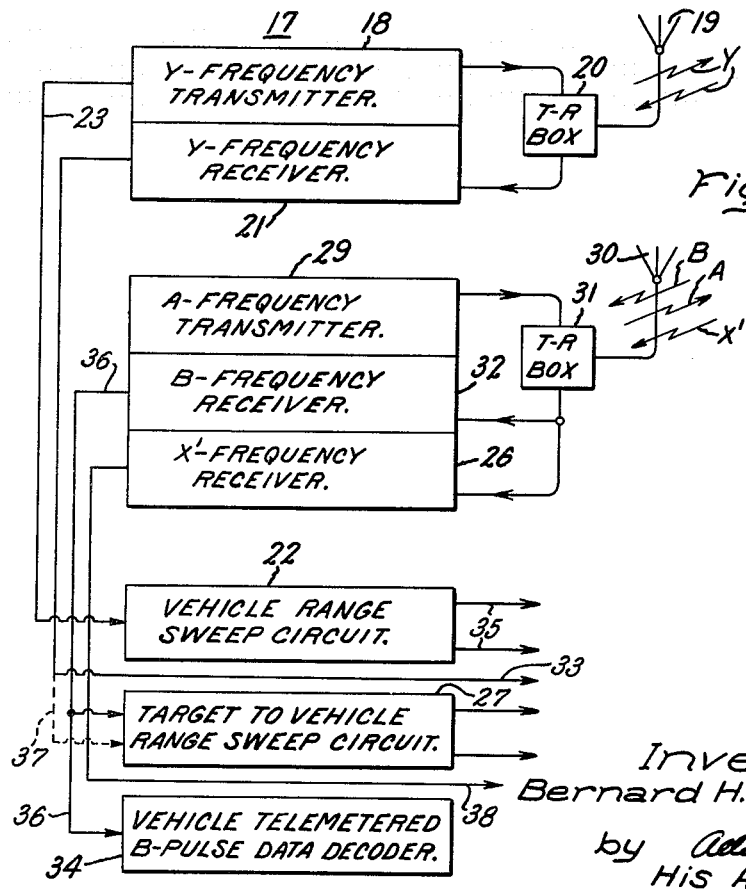
FIGURE 5 shows in block diagram form the circuitry and components which are provided at the central command radar station for the purpose of triggering the sweep potentials to indicate vehicle range and target-to-vehicle range.

Continuing with the detailed description of the invention, and turning more particularly to FIGURE 5, the reference numeral 17 has been used to indicate generally a block diagram of the circuitry and components provided at the central command radar. In this figure, there is illustrated a Y-frequency transmitter 18 which is connected to provide electromagnetic energy to a radar antenna 19 via a conventional TR box 20. The radar antenna 19 is, of course, also disposed to receive reflected radiant energy and to apply such radiant energy, via the TR box 20, to a Y-frequency receiver 21. The function of transmitter 18 and the receiver 21 are best understood by referring to the wave form diagram shown in FIGURE 2. In this figure, the emission of the pulse Y, the gradual rise of the sweep voltage for providing a range-to-vehicle trace, and the detection of the remote vehicle skin echo on frequency Y are clearly shown. In order to expedite an understanding of this portion of the invention, the radiated and reflected energy on frequency Y is indicated diagrammatically in proximity to the antenna 19.

The functional relationship between the Y-frequency transmitter 18, the Y-frequency receiver 21, and the sweep potentials for the range-to-vehicle display is indicated diagrammatically in FIGURE 5. The reference numeral 22 has been used in this figure to identify a vehicle range sweep circuit. The vehicle range sweep circuit is connected by means of appropriate conduit 23 to the Y-frequency transmitter 18 to provide coordination between the initiation of the sweep potential 4 and transmission of pulse Y. By means of conventional circuitry and components (not shown) the radar pips "Y" shown in the upper wave form of FIGURE 2 are provided from the Y-frequency receiver 21 along conduit 33 to the range-to-vehicle trace. The range-to-vehicle trace is produced by an electron beam which is moved between deflecting electrodes in accordance with the potential produced at the output terminals 35 of the vehicle range sweep circuit 22.

Turning from the description of the circuitry and components for influencing the range sweep in the radar oscilloscope, reference to the transponder type circuitry in FIGURE 5 will now be made. More particularly, the numeral 29 in this figure designates an A-frequency transmitter which couples interrogating pulses to a radar antenna 30 via a conventional TR box 31. The radar antenna 30 is capable of radiating transponder interrogating pulses on frequency A and receiving reply pulses including telemetry information on a frequency B. This has been indicated by the appropriate legends provided in FIGURE 5 in proximity with the antenna 30. Incoming reply signals of frequency B are coupled through the TR box 31 to the B-frequency receiver designated 32.

The diagrammatic mode of representation should be utilized with FIGURE 2 for an understanding of the manner in which the potentials shown in the wave forms in FIGURE 2 are correlated in time with the transponder interrogating and reply pulses acted upon by the circuitry in FIGURE 5.

Reference will now be made to the action of the target-to-vehicle range sweep circuit 27. It will be recalled that the sweep potential in the lower wave form of FIGURE 2 is initiated at the central control radar in response to the receipt of a B response. The B-pulse telemetry beacon energy is detected after transmission of Y-frequency from the central command radar and is used via conduit 36 to trigger the sweep in this manner. In addition, the telemetered information contained in the B-pulse response received by the B-frequency receiver 32 is decoded in a decoding stage 34 connected to the receiver by means of conduit 36. Decoder 34 utilizes conventional digital and/or analog telemetry techniques to decode the information in the B-pulse. Dotted conduit 37 indicates that the skin echo or received Y-frequency energy which is coincident in time with the B-response is available as an alternative initiator for the target-to-vehicle range sweep circuit 27.

The radar pip which appears on the range trace to indicate distance between target and vehicle is initiated in response to the detection of radiant energy at the heterodyned frequency X' at the central command radar by receiver 26 and is provided via conduit 38.

It will now be evident that there has been disclosed system and components for the purpose of illustrating and describing the several embodiments of the present invention. However, it will be equally evident that many alterations, changes and substitutions may be made without departing in any manner from the spirit and scope of the appended claims.

What is claimed is:

1. In an airborne radar system for scanning a target area in response to pulses of radar energy received from a central command radar, means including a transponder beacon provided with a receiver for detecting interrogating pulses of a first frequency from said central command radar and a transmitter for radiating reply pulses on a second frequency, means connected to transmit a target scanning pulse from said vehicle responsive to detection by said receiver of energy radiated by said command radar at a third frequency, and mixer means connected to detect target echoes at said third frequency returning to said vehicle and re-transmit pulses to said command radar at a fourth frequency responsive thereto.

2. In a system for synchronizing and timing a remote vehicle borne radar from a plural frequency central command radar, means including said central command radar for propagating electromagnetic energy of predetermined frequency and duration, transmitter means mounted within said vehicle for emitting radar pulses of a different frequency responsive to detection of said predetermined frequency, means including frequency changing means mounted within said vehicle to detect and transmit on a new frequency the target echoes on said different frequency arriving at said vehicle, and means including sweep circuit control means connected at said central command radar to initiate production of at least one sweep potential concurrently with reception of said different frequency thereat.

3. In a system for synchronizing and timing a remote vehicle borne radar from a plural frequency central command radar, means including said central command radar for propagating electromagnetic energy of predetermined frequency and duration, means including a transponder command telemetry beacon comprising at least one receiver and transmitter located within said vehicle, said means further including a second transmitter connected to radiate its main pulse upon detection of said predetermined frequency and receive target echoes thereafter, frequency changer means connected within said vehicle to receive said target echoes and propagate radar pulses on a new frequency responsive thereto, and means including sweep circuit control means connected at said central command radar to initiate production of at least one sweep potential concurrently with reception at said central command radar of energy of predetermined frequency reflected from said remote vehicle.

4. In a system for synchronizing and timing a remote vehicle borne radar from a plural frequency central command radar, means including said central command radar for propagating electromagnetic energy of predetermined frequency and duration, transmitter means mounted within said vehicle for emitting radar pulses of a different frequency responsive to detection of said predetermined frequency, means including frequency changing means mounted within said vehicle to detect and transmit on a new frequency the target echoes on said different frequency arriving at said vehicle, first sweep circuit control means connected at said central command radar to initiate production of a first sweep potential for measuring range to said vehicle concurrently with emission of said predetermined frequency, and second sweep circuit control means connected at said central command radar to initiate sweep voltage for measuring range from said vehicle to a target concurrently with reception of said different frequency.

5. In a system for synchronizing and timing a remote vehicle borne radar from a plural frequency central command radar, means including said central command radar for propagating electromagnetic energy of predetermined frequency and duration, means including a transponder beacon comprising at least one receiver and transmitter located within said vehicle, said means further including a second transmitter connected to radiate its main pulse on a different frequency upon detection of said predetermined frequency and receive echoes from a target area thereafter, frequency changer means connected within said vehicle to receive said target echoes and propagate radar pulses on a new frequency responsive thereto, first sweep circuit control means connected at said central command radar to initiate production of a first sweep potential for measuring range to said vehicle concurrently with emission of said predetermined frequency, and second sweep control means connected at said central command radar to initiate a second sweep voltage for establishing range from said vehicle to said target area concurrently with reception of said electromagnetic energy of predetermined frequency and duration at said central command radar reflected from said remote vehicle.

6. The method of visually portraying at a remote radar station both the range between a target and an airborne vehicle in conventional radar relationship, and the range from said radar station to said vehicle, said method comprising the steps of transmitting pulses of electromagnetic energy of given frequency and duration from said remote radar station, simultaneously initiating the generation of a first sweep potential at said remote radar station for displaying range-to-vehicle data, emitting radiant energy from said airborne vehicle to said target responsive only to detection of said electromagnetic energy of said given frequency, triggering the initiation of a second sweep potential for displaying vehicle-to-target range data concurrently with reception at said remote radar station of said pulses of electromagnetic energy of said given frequency reflected from said airborne vehicle, and deflecting the electron beam influenced by said second sweep potential to cause a pip immediately upon receipt of pulses retransmitted by said airborne vehicle corresponding to target echoes and of a frequency differing therefrom.

7. The method of visually portraying at a central command radar both the range between a target and an airborne vehicle in conventional radar relationship, and the range from said radar station to said vehicle, said method comprising the steps of transmitting pulses of electromagnetic energy of given frequency and duration from said central command radar, simultaneously initiating the generation of a first sweep potential at said central command radar for displaying range-to-vehicle data, emitting radiant energy from said airborne vehicle to said target responsive only to detection of said electromagnetic energy of said given frequency, triggering the initiation of a second sweep potential for displaying the vehicle-to-target range data at said central command radar and deflecting the electron beam swept by said first sweep potential responsive to receipt of skin echo from said vehicle of said given frequency, and deflecting the electron beam influenced by said second sweep potential to cause a pip immediately upon receipt of pulses retransmitted by said airborne vehicle corresponding to target echoes and of a frequency differing therefrom.

8. In combination with a plural frequency central command radar capable of propagating electromagnetic energy of predetermined frequency and receiving electromagnetic energy from an airborne vehicle on a different frequency, transponder beacon means mounted within said airborne vehicle for transmitting to a target a main pulse upon detection of said predetermined frequency and receive target echoes thereafter, means in said airborne vehicle for transmitting another pulse for transmission to said central command radar concurrently with the transmission of said main pulse, means mounted within said vehicle to detect said target echoes and propagate radar pulses on said different frequency responsive thereto, and means including sweep circuit control means connected at said central command radar to initiate production of at least one sweep potential concurrently with the reception at said central command radar of said another pulse, the electron beam influenced by said sweep potential being deflected to cause a pip upon receipt of said different frequency.

References Cited in the file of this patent
UNITED STATES PATENTS

| | | |
|---|---|---|
| 2,471,373 | Joyner | May 24, 1949 |
| 2,528,202 | Wolff | Oct. 31, 1950 |
| 2,637,022 | De France | Apr. 28, 1953 |